(12) United States Patent
McDonald et al.

(10) Patent No.: US 6,648,520 B2
(45) Date of Patent: Nov. 18, 2003

(54) FIBER OPTIC PLUG

(75) Inventors: A. John McDonald, Lenoir, NC (US);
Stuart R. Melton, Hickory, NC (US);
Hieu V. Tran, Charlotte, NC (US);
James P. Luther, Hickory, NC (US);
Darrell R. Childers, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 63 days.

(21) Appl. No.: 09/967,259

(22) Filed: Sep. 28, 2001

(65) Prior Publication Data

US 2003/0063867 A1 Apr. 3, 2003

(51) Int. Cl.$^7$ ................................................ G02B 6/36
(52) U.S. Cl. .............................. 385/78; 385/72; 385/76; 385/59; 385/83
(58) Field of Search ........................... 385/72, 59, 76, 385/83

(56) References Cited

U.S. PATENT DOCUMENTS

| | | | | |
|---|---|---|---|---|
| 4,354,731 A | | 10/1982 | Mouissie | ................ 350/96.21 |
| 5,923,804 A | * | 7/1999 | Rosson | ........................ 385/81 |
| 6,149,313 A | * | 11/2000 | Giebel et al. | ................ 385/59 |
| 6,151,432 A | * | 11/2000 | Nakajima et al. | ............. 385/60 |
| 6,234,683 B1 | * | 5/2001 | Waldron et al. | ............... 385/78 |
| 6,234,685 B1 | * | 5/2001 | Carlisle et al. | ................ 385/83 |

FOREIGN PATENT DOCUMENTS

| | | | | |
|---|---|---|---|---|
| EP | 08556120 A2 | 7/1998 | ............ | G02B/6/38 |
| EP | 0940700 A2 | 9/1999 | ............ | G02B/6/38 |
| EP | 0949522 A2 | 10/1999 | ............ | G02B/6/38 |
| EP | 1065542 A1 | 1/2001 | ............ | G02B/6/38 |

* cited by examiner

*Primary Examiner*—Hemang Sanghavi
*Assistant Examiner*—Eric Wong

(57) ABSTRACT

A relatively small fiber optic plug is provided to facilitate pulling of the fiber optic plug and an associated fiber optic cable through small passageways. The fiber optic plug may include a shroud that protects the fiber optic connector and that may further define at least one opening, and preferably a pair of openings. The openings are sized to receive portions of an adapter sleeve once the fiber optic plug is mated with a fiber optic receptacle. The fiber optic plug may also include a cap mounted upon and adapted to swivel relative to the remainder of the fiber optic plug to serve as a pulling grip during installation of the fiber optic cable. Further, the fiber optic plug may include a crimp band that is mechanically coupled to both the fiber optic cable and the plug body in order to isolate the fiber optic connector from torque otherwise created by forces to which the fiber optic cable is subjected.

17 Claims, 10 Drawing Sheets

FIBER OPTIC PLUG

FIELD OF THE INVENTION

This invention relates generally to assemblies for interconnecting or otherwise terminating optical fibers and, more particularly, to fiber optic plugs for mating with corresponding receptacles.

BACKGROUND OF THE INVENTION

Optical fibers are used in an increasing number and variety of applications, such as a wide variety of telecommunications and data transmission applications. As a result, fiber optic networks must include an ever increasing number of enclosures in which one or more of the optical fibers are interconnected or otherwise terminated. For example, fiber optic networks, such as cable television (CATV) networks, may include a number of optical network units (ONUs) in which the optical signals propagating along the optical fibers are converted to respective electrical signals. In addition, telephone and CATV networks can include a number of network interface devices (NIDs); each NID is associated with a particular subscriber. Upon receiving the incoming optical signals, the NID splits and routes the signals to predetermined locations, such as to various telephone or CATV outlets. Like an ONU, the NID can also convert the incoming optical signals to electrical signals, if necessary. Fiber optic networks can also include a number of other closures, including splice closures, in which various ones of the optical fibers are spliced or optically connected. Regardless of the type, these enclosures provide protection, such as from moisture or other forms of environmental degradation, for the optical fibers and, more particularly, the point at which the optical fibers are spliced or are otherwise optically connected.

These enclosures, such as ONUs, NIDs, and other closures, typically include one or more receptacles in which the individual optical fibers of a fiber optic cable are connected to respective optical fibers within the enclosure. The optical fibers within the enclosure can then be interconnected or otherwise terminated as desired. Conventionally, receptacles have included a receptacle housing defining an internal cavity and an adapter sleeve disposed in a fixed position within the internal cavity defined by the receptacle housing. The adapter sleeve is designed to receive a pair of ferrules, each of which is mounted upon the end portions of a plurality of optical fibers. One of the ferrules is attached to the end of optical fibers extending from a cable, ribbon, or optical fiber device that extends into or is located in the interior of the enclosure to facilitate splicing or other interconnection or termination of the optical fibers. As described below, the other ferrule is mounted upon optical fibers extending from a cable, ribbon, or optical fiber device that extends outside or is located outside of the enclosure, such as the optical fibers of a fiber optic cable. The adapter sleeve assents in gross alignment of the ferrules, and ferrule guide pins or other alignment means assent in detailed alignment of the optical fibers mounted on the end faces of each ferrule.

In order to mate with the receptacle of a conventional enclosure, a fiber optic plug is mounted upon the end portion of a fiber optic cable. Typically, the plug includes a generally cylindrical plug body and a fiber optic connector including a plug ferrule disposed within the cylindrical plug body. In order to protect the plug ferrule, the cylindrical plug body may partially or completely surround the lateral sides of the fiber optic connector. While the end of the cylindrical plug body is open such that the ferrule is accessible, the end of the cylindrical plug body does extend slightly beyond the ferrule to provide further protection. The ferrule is mounted upon a plurality of optical fibers of the fiber optic cable such that mating of the plug and the receptacle will align or connect the optical fibers of the fiber optic cable with respective optical fibers within the enclosure.

In the process of mating the plug and the receptacle, the plug ferrule is inserted into one end of the adapter sleeve of the receptacle. The adapter sleeve therefore aligns the plug ferrule with a receptacle ferrule that is attached to the end portions of optical fibers from a cable, ribbon, or optical fiber device that extends into or is located in the interior of the enclosure. As a result of the construction of a conventional fiber optic plug, one end of the adapter sleeve is received within the open end of the plug body as the plug ferrule is inserted into the adapter sleeve. In addition, in order to retain the plug ferrule within the adapter sleeve, the fiber optic connector of the fiber optic plug and the adapter sleeve are designed to be mechanically coupled, such as by means of a pair of latches. While the latches effectively couple the plug ferrule and the adapter sleeve, the mechanical coupling of the fiber optic connector and the adapter sleeve disadvantageously limit float between the plug ferrule and the adapter sleeve.

Once the plug and the receptacle have been mated, the fiber optic cable may be subjected to forces that create torque upon the fiber optic connector including the plug ferrule. This torque will disadvantageously increase the attenuation of the optical signals transmitted via the optical fibers upon which the plug ferrule is mounted. Even worse, this torque may break the optical fiber. Traditionally, the fiber optic cables upon which the fiber optic plugs are mounted have been quite flexible such that the plug ferrule has been subjected to only minimal amounts of torque. More recently, however, fiber optic plugs are being installed upon fiber optic cables that are much stiffer, such as the armored fiber optic cables designed for outdoor applications. As a result of the increased stiffness of these fiber optic cables, forces upon the fiber optic cable are much more readily transmitted to the plug ferrule, thereby imposing increased torque upon the plug ferrule. As a result of the increased attenuation of the optical signals created by the torque, it would be advantageous for the fiber optic plug to at least partially isolate the plug ferrule and the optical fibers upon which the plug ferrule is mounted from those forces to which the fiber optic cable are subjected.

Prior to engagement with the receptacle, a fiber optic cable, including the end portion of the fiber optic cable upon which the plug is mounted, must oftentimes be installed, such as by pulling, along a predetermined cable path. In some instances, the fiber optic cable must extend through ducts or other small passageways that are not much larger than the fiber optic cable itself. Since the plug body must be sufficiently large to receive and surround one end of the adapter sleeve, the size of the plug body may limit the minimum size of the duct or other passageway through which the fiber optic cable is installed. This limitation on the minimum size of the duct is becoming increasingly disadvantageous as additional emphasis is now placed upon reducing the space required for installing a fiber optic cable, i.e., reducing the duct size, in view of the large number of fiber optic cables that are currently installed. To date, however, reductions in the size of the duct through which a fiber optic cable is pulled are limited, at least in part, by the size of the plug body mounted upon the end portion of the fiber optic cable.

In order to pull a fiber optic cable, a pulling grip is typically mounted to the leading end of the fiber optic cable including the fiber optic plug in those embodiments in which a fiber optic plug has been mounted upon the end portion of the fiber optic cable. The pulling grip is designed to securely engage the end of the fiber optic cable load coupled to the strength element of the cable and to provide a point of attachment for a rope, a cable or the like that is utilized to pull the fiber optic cable. Since the fiber optic cable must frequently be pulled along a predetermined cable path that twists and turns, pulling grips designs are adapted to swivel or rotate relative to the fiber optic cable to avoid imparting undesirable torque on the fiber optic cable as it is pulled along a path. Typically, a pulling grip that is adapted to swivel relative to the fiber optic cable includes a plurality of components that must be connected to the fiber optic cable. The components of this conventional pulling grip are connected to each other in a manner that permits the component to which the rope, cable, or the like is attached to rotate or swivel relative to the component directly attached to the fiber optic cable. Thus, while pulling grips that swivel relative to the fiber optic cable are available, it would be advantageous to provide a pulling grip that is adapted to swivel relative to the fiber optic cable that has a simpler construction in order to facilitate use of the pulling grip and to reduce the cost of the pulling grip.

SUMMARY OF THE INVENTION

An improved fiber optic plug is provided according to this invention. According to one embodiment of this invention, the fiber optic plug is designed to facilitate the pulling of the fiber optic plug and an associated fiber optic cable through relatively small passageways. In order to further facilitate the pulling of the fiber optic plug and associated fiber optic cable through a passageway, the fiber optic plug of includes a cap mounted upon and adapted to swivel relative to the remainder of the fiber optic plug thereby providing a mechanism for pulling the fiber optic cable and for permitting the fiber optic cable to swivel or rotate relative thereto while having fewer parts than conventional pulling grips. Further, the fiber optic plug isolates the fiber optic connector and, in turn, the plug ferrule, from torque otherwise created by forces to which the fiber optic cable is subjected.

According to an embodiment, the fiber optic plug includes a fiber optic connector having a connector housing and a plug ferrule at least partially disposed within the connector housing and capable of being mounted upon end portions of a plurality of optical fibers. The fiber optic plug also includes a plug body extending lengthwise between opposed first and second ends and defining a longitudinal axis. The plug body has a shroud proximate the first end. In one embodiment, the shroud defines at least one opening that extends lengthwise from at least a medial portion of the shroud to the first end of the plug body. In a preferred embodiment, the shroud defines a pair of openings on opposite sides that extend lengthwise from at least a medial portion of the shroud to the first end of the plug body. In other embodiments, the shroud does not include openings.

In embodiments in which the shroud is cylindrical and has a pair of openings, the first end of the shroud therefore includes a pair of arcuate shroud portions separated by the openings. Preferably, the openings defined by the shroud are aligned with one another. The fiber optic connector is disposed within the plug body in a fixed position with respect to the plug body relative to rotation about the longitudinal axis such that the openings defined by the shroud are also longitudinally aligned with the plug ferrule. In this regard, the plug ferrule typically defines a plurality of bores extending lengthwise in a reference plane. As such, the openings defined by the shroud are preferably centered about this reference plane.

According to an embodiment, a fiber optic assembly is also provided in which a fiber optic receptacle is designed to mate with a fiber optic plug. The fiber optic receptacle includes a fiber optic receptacle housing defining an internal cavity opening through opposed first and second ends. The fiber optic receptacle also includes an adapter sleeve disposed within the internal cavity defined by the receptacle housing. The adapter sleeve defines a lengthwise extending passage for receiving a portion of the plug ferrule of the fiber optic plug. In this regard, the plug ferrule is disposed within the plug body such that the plug ferrule is accessible within the shroud via the first end of the plug body, even though the shroud preferably extends somewhat beyond the plug ferrule. Further, the shroud and the adapter sleeve are sized such that portions of the adapter sleeve are disposed within the openings defined by the shroud once the plug ferrule of the fiber optic plug is inserted into the adapter sleeve. Thus, in this embodiment the shroud does not completely surround the adapter sleeve as provided by conventional fiber optic plugs. Accordingly, the shroud can be reduced in size relative to the shrouds of conventional fiber optic plugs, thereby decreasing the overall size of the fiber optic plug in this embodiment of this invention. Since the fiber optic plug sometimes limits the size of a duct or other passageway through which the fiber optic plug and the associated fiber optic cable are pulled, the fiber optic plug of this embodiment can advantageously be pulled through smaller ducts and other passageways than conventional fiber optic plugs.

According to another embodiment of this invention, a fiber optic plug is provided that includes a fiber optic connector having a connector housing and a plug ferrule at least partially disposed within the connector housing. The fiber optic plug also includes a crimp band. A first portion of the crimp band is adapted to operable engage the fiber optic connector and a second portion of the crimp band is adapted to engage the fiber optic cable. The fiber optic plug of this embodiment also includes a plug body defining a longitudinal axis. According to this embodiment, the crimp band and the plug body include respective engagement members that mate with one another in order to mechanically couple the crimp band and the plug body and in order to prevent relative rotation therebetween about the longitudinal axis. For example, the crimp band typically includes a key. Correspondingly, the plug body generally defines a lengthwise extending passageway and a keyway opening into the passageway. The crimp band can therefore be at least partially disposed within the passageway defined by the plug body such that the key engages the keyway. In this embodiment, both the key defined by the crimp body and the keyway defined by the plug body preferably extend in a longitudinal direction. Thus, longitudinal motion between the crimp band and the plug body is permitted while relative rotation between the crimp band and the plug body about the longitudinal axis is prevented. By preventing relative rotation between the crimp band and the plug body, any torque to which the fiber optic cable is subjected is transmitted to the plug body via the crimp band and, in turn, to the receptacle housing of the receptacle to which the fiber optic plug is connected. Thus, the fiber optic connector and, in particular, the plug ferrule are protected or isolated from any torque to which the fiber optic cable is subjected since the plug body to which the fiber optic connector is engaged via the engagement members of the crimp band and plug body will move very little, if at all, in response to torque on the fiber optic cable.

In an embodiment, the crimp band extends lengthwise between opposed first and second ends and the first and second portions of the crimp band are proximate the first and second ends, respectively. In embodiments in which the crimp band includes a key, the key may therefore be carried by a medial portion of the crimp band that is disposed between the first and second portions of the crimp band. Alternatively, the crimp band may include an enlarged portion that is disposed proximate the second portion of the crimp band that carries the key. Regardless of the configuration, the first and second portions of the crimp band are capable, however, of being compressed in order to secure the crimp band to the fiber optic connector and the fiber optic cable, respectively. Although the first and second ends are compressed, the key portion of the crimp band is only slightly deformed, if at all.

In an embodiment, the fiber optic connector includes a spring push attached to the connector housing. In this embodiment, the first end of the crimp band engages the spring push. More particularly, the spring push may include a crimp body designed to be engaged by the first portion of the crimp band. With respect to the engagement of the fiber optic cable by the crimp band, the fiber optic cable may further include a support tube disposed within the cable jacket of the fiber optic cable and surrounding the plurality of optical fibers. The support tube is aligned with the second portion of the crimp band such that the second portion of the crimp band crimps the cable jacket between the second portion of the crimp band and the support tube. Thus, the crimp band securely engages both the fiber optic cable and the fiber optic connector. Moreover, the respective engagement members of the crimp band and the plug body may mechanically couple the crimp band and the plug body and prevent relative rotation therebetween, thereby protecting the fiber optic connector and, in turn, the plug ferrule from the otherwise deleterious effects of torque imparted upon the fiber optic cable.

According to another embodiment, the fiber optic plug includes a plug body extending in a lengthwise direction between opposed first and second ends and defining a longitudinal axis therethrough. The fiber optic plug also includes a fiber optic connector having a connector housing and a plug ferrule at least partially disposed within the connector housing. The fiber optic connector is disposed within the plug body such that the plug ferrule is accessible via the first end of the plug body. The fiber optic plug also includes a cap mounted upon the plug body so as to cover at least the first end thereof. The cap is mounted upon the plug body such that travel of the cap in the lengthwise direction is limited while permitting the cap to rotate about the longitudinal axis relative to the plug body. Thus, the cap is adapted to swivel relative to the remainder of the plug body, while remaining connected to the plug body. The cap may therefore effectively serve as a pulling grip in order to pull the fiber optic plug and the fiber optic cable to which the fiber optic plug is connected through a passageway. In this regard, the cap may define an opening that may be engaged by a rope, a cable or the like to facilitate the pulling of the fiber optic plug and the fiber optic cable through the passageway. Not only does the cap protect the fiber optic connector while pulling the fiber optic plug and the fiber optic cable through the passageway, but the cap is relatively small and, in fact, need not be much larger than the plug body. Thus, the cap does not substantially limit the size of the passageway through which the fiber optic plug and the fiber optic cable may be pulled.

The plug body preferably includes a shaft and a collar disposed upon the shaft such that travel of the collar in the lengthwise direction is limited even though rotation of the collar about the longitudinal axis defined by the shaft is permitted. In one embodiment, the shaft includes a threaded portion and the collar includes an internally threaded portion. Thus, the collar may be mounted upon the shaft by threadably advancing the collar onto the shaft. The plug body also includes a shroud proximate the first end of the plug body and adjacent the shaft. The shroud is larger than the shaft such that travel in the collar is limited by the threaded portion of the shaft on one end and the shroud on the other end. The cap is adapted to be attached to the collar for movement therewith. Once the cap is removed, such as following the pulling of the fiber optic cable through a passageway and in preparation for mating the fiber optic plug with a corresponding receptacle, the collar is adapted to engage the fiber optic receptacle.

BRIEF DESCRIPTION OF THE DRAWINGS

Figure 1:
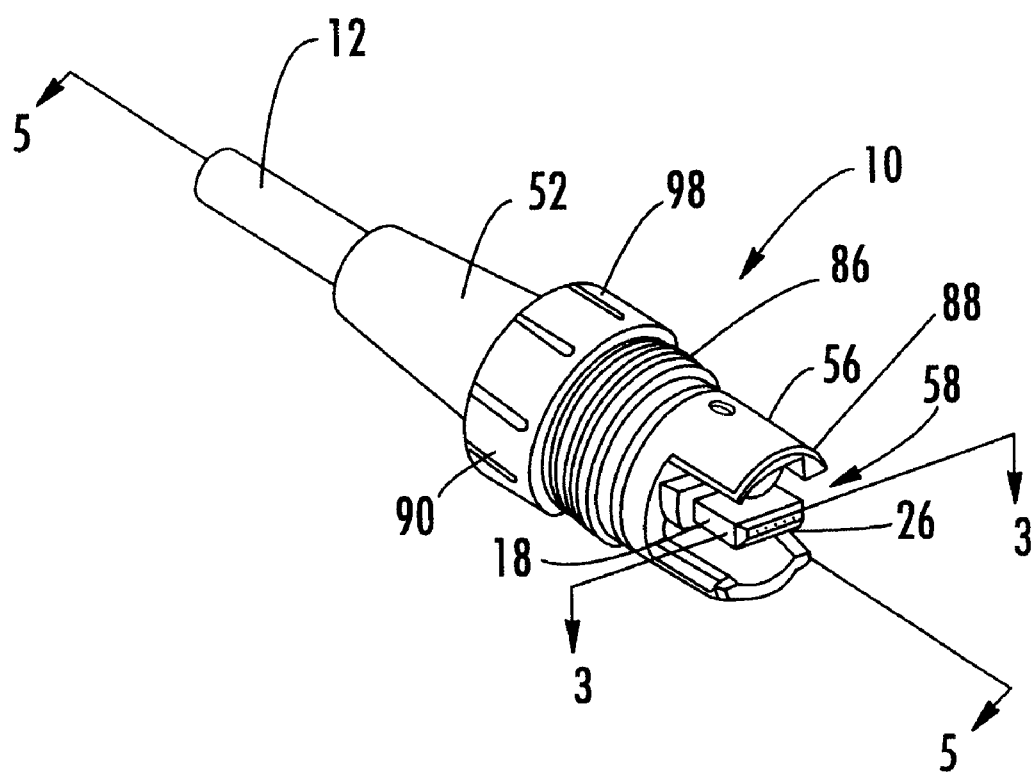
Figure 2:
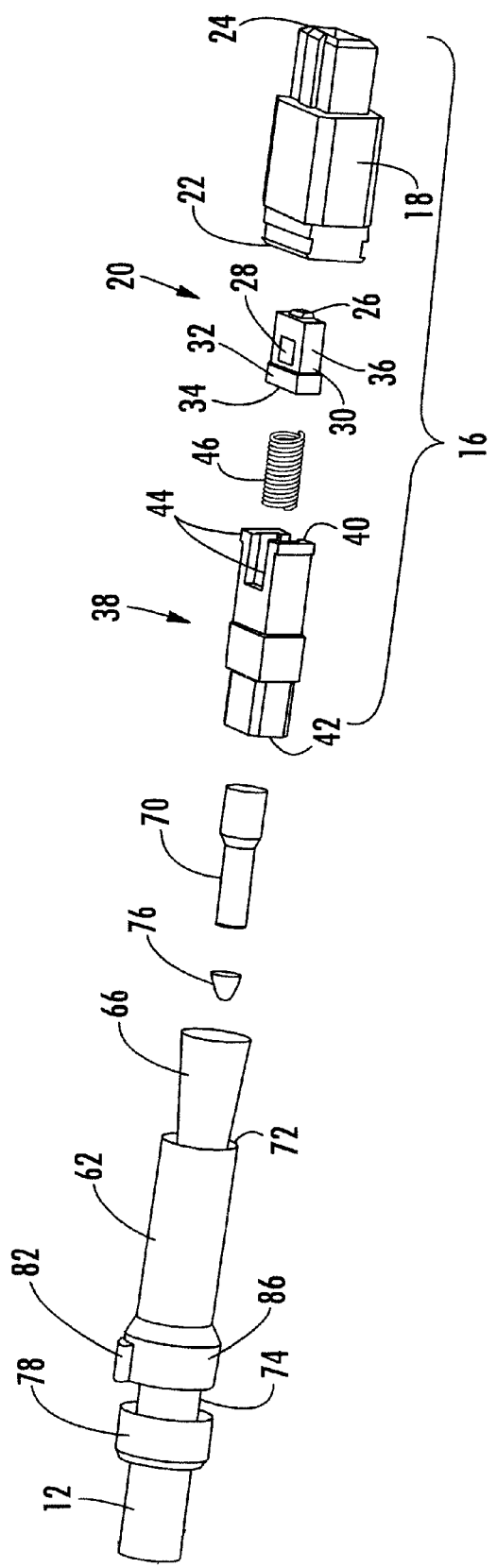
Figure 3:
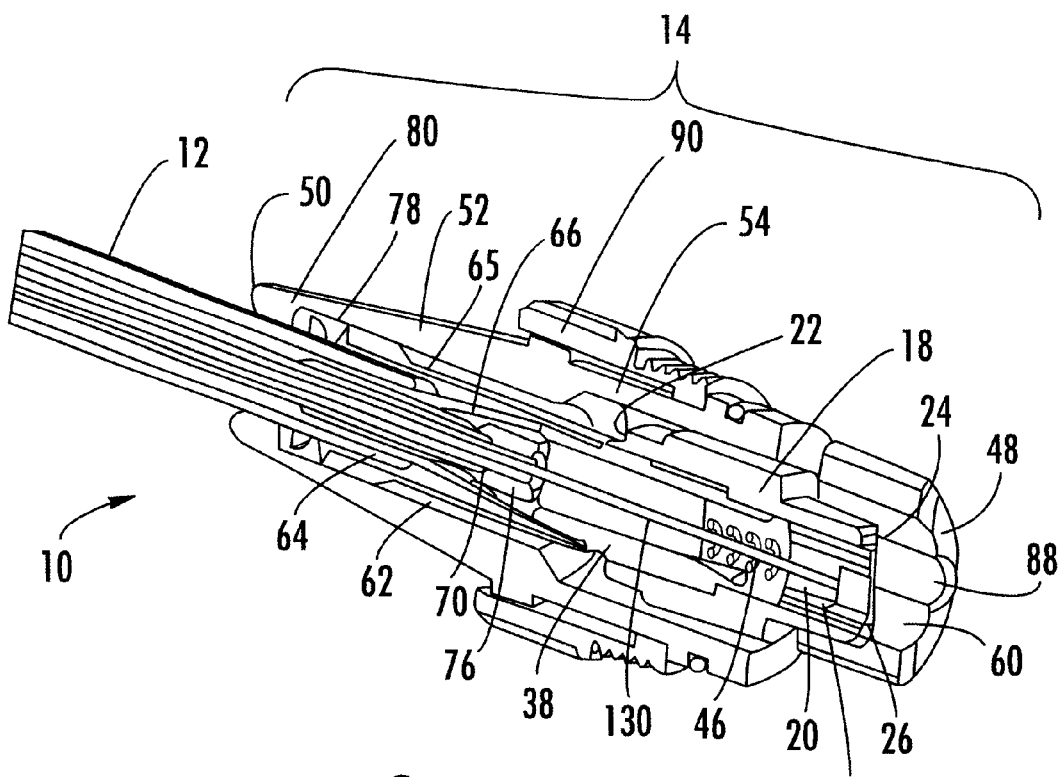
Figure 4:
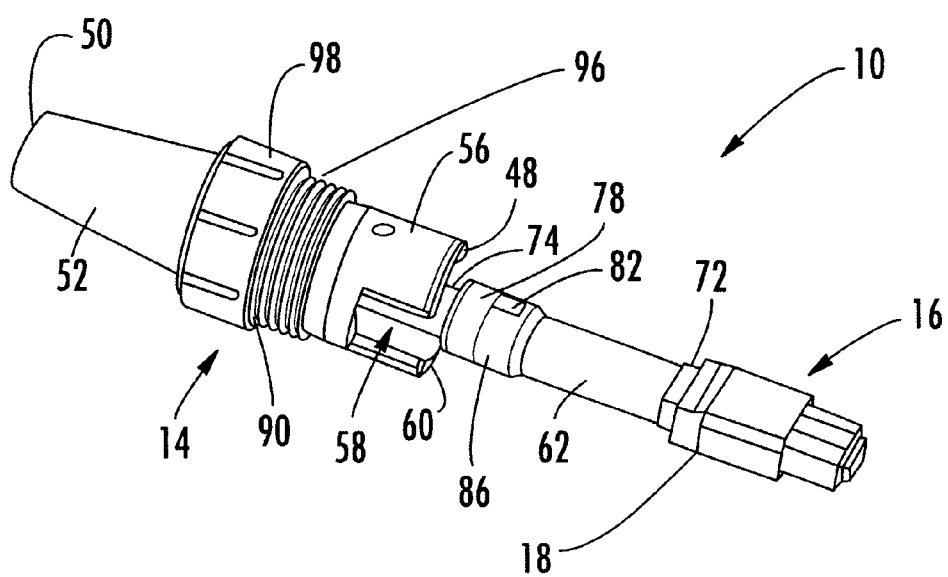
Figure 5:
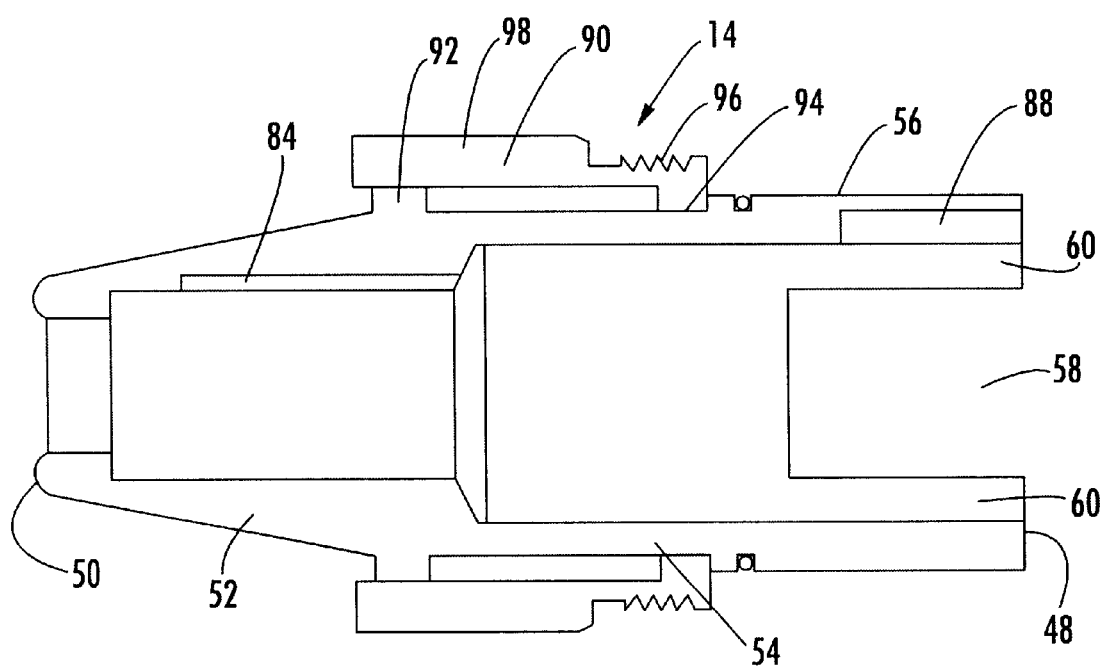
Figure 6:
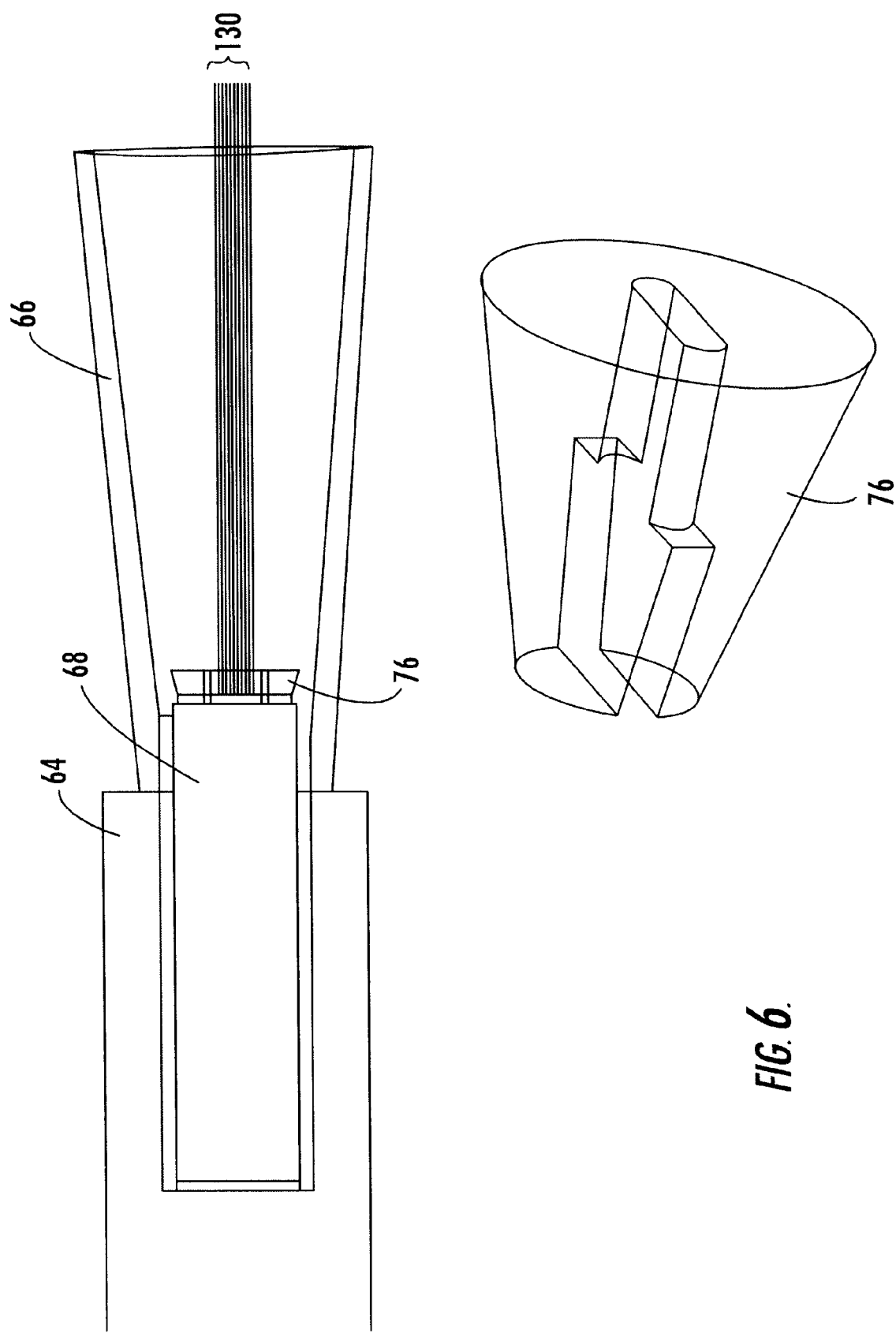
Figure 7:
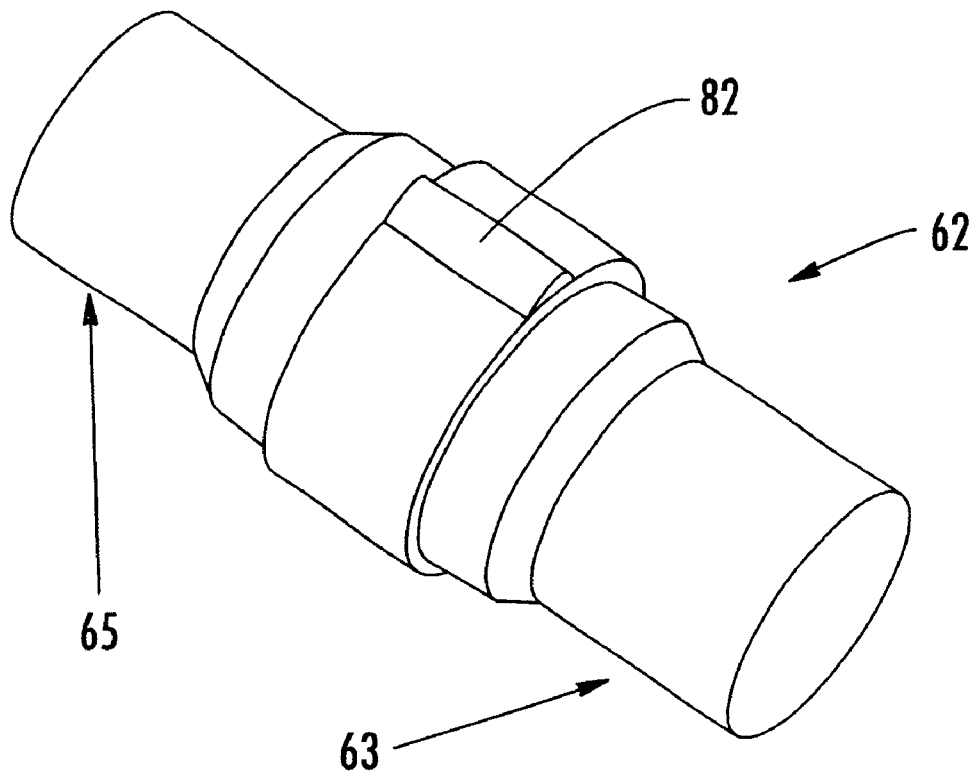
Figure 8:
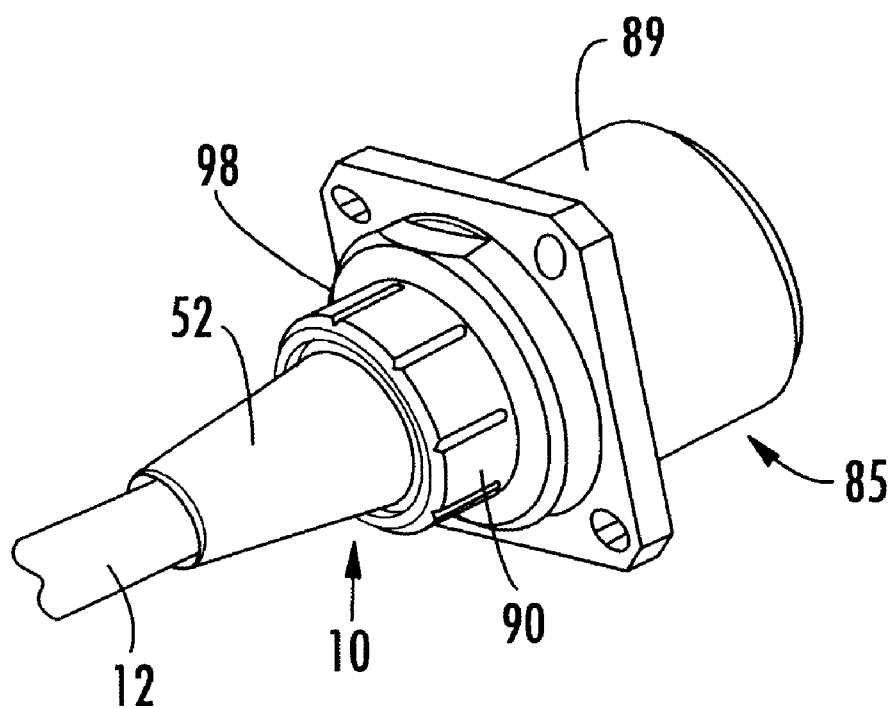
Figure 9:
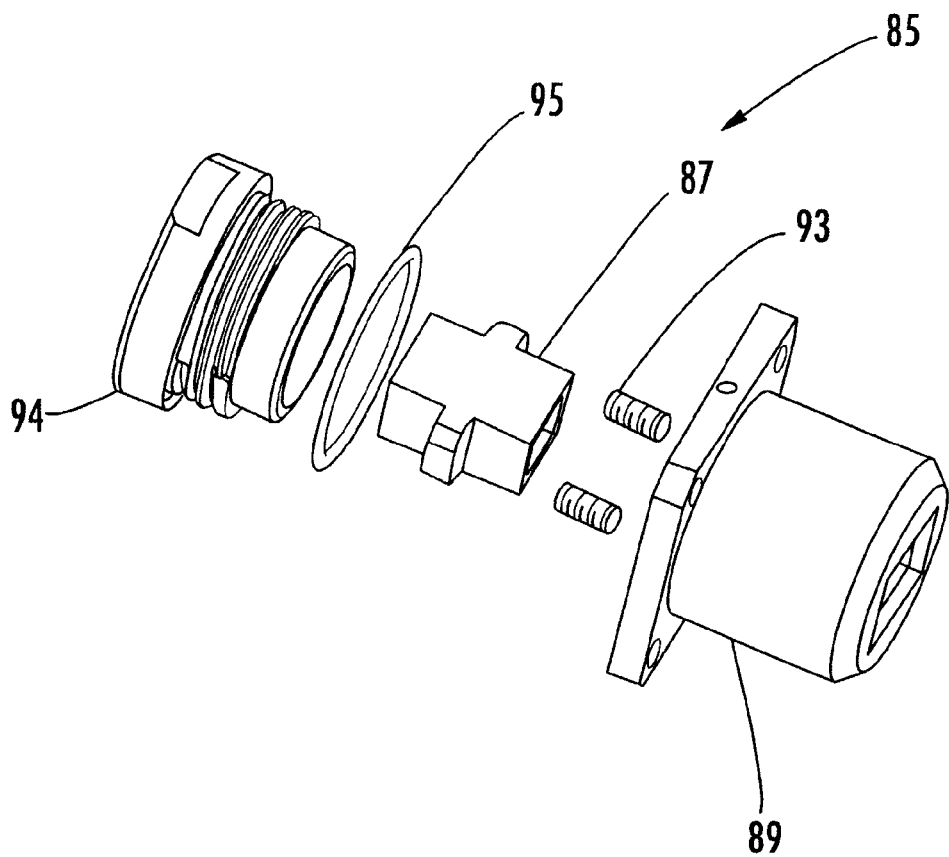
Figure 10:
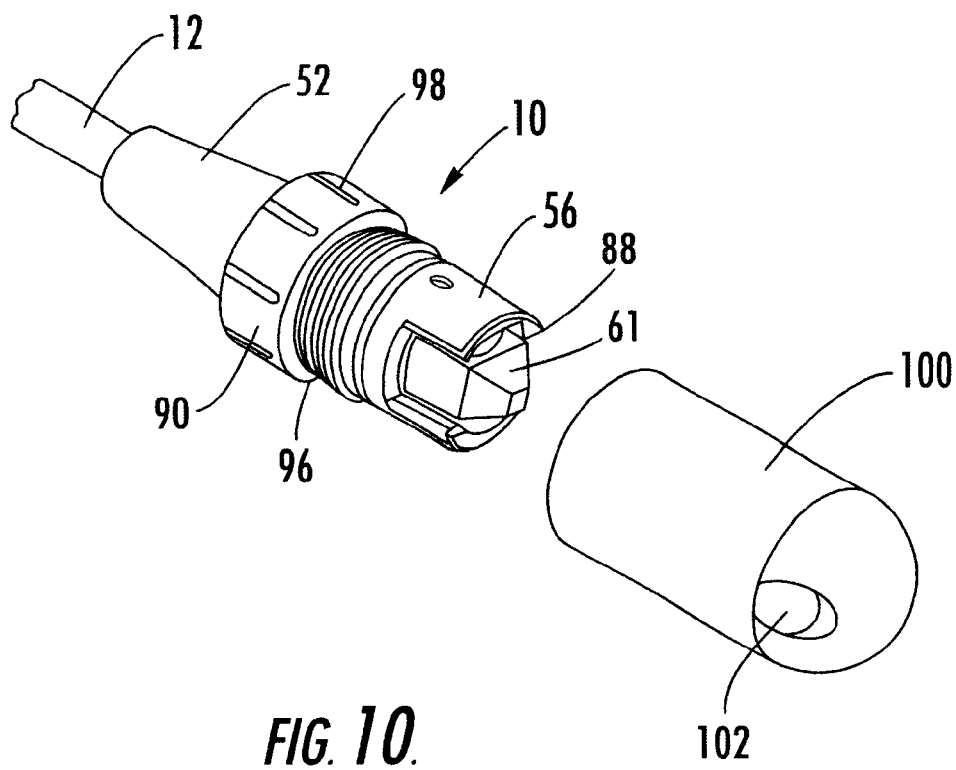
Figure 11:
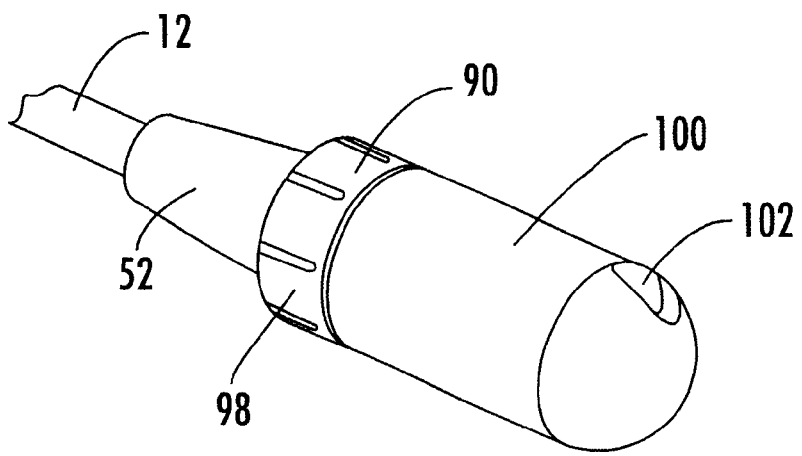
Figure 12:
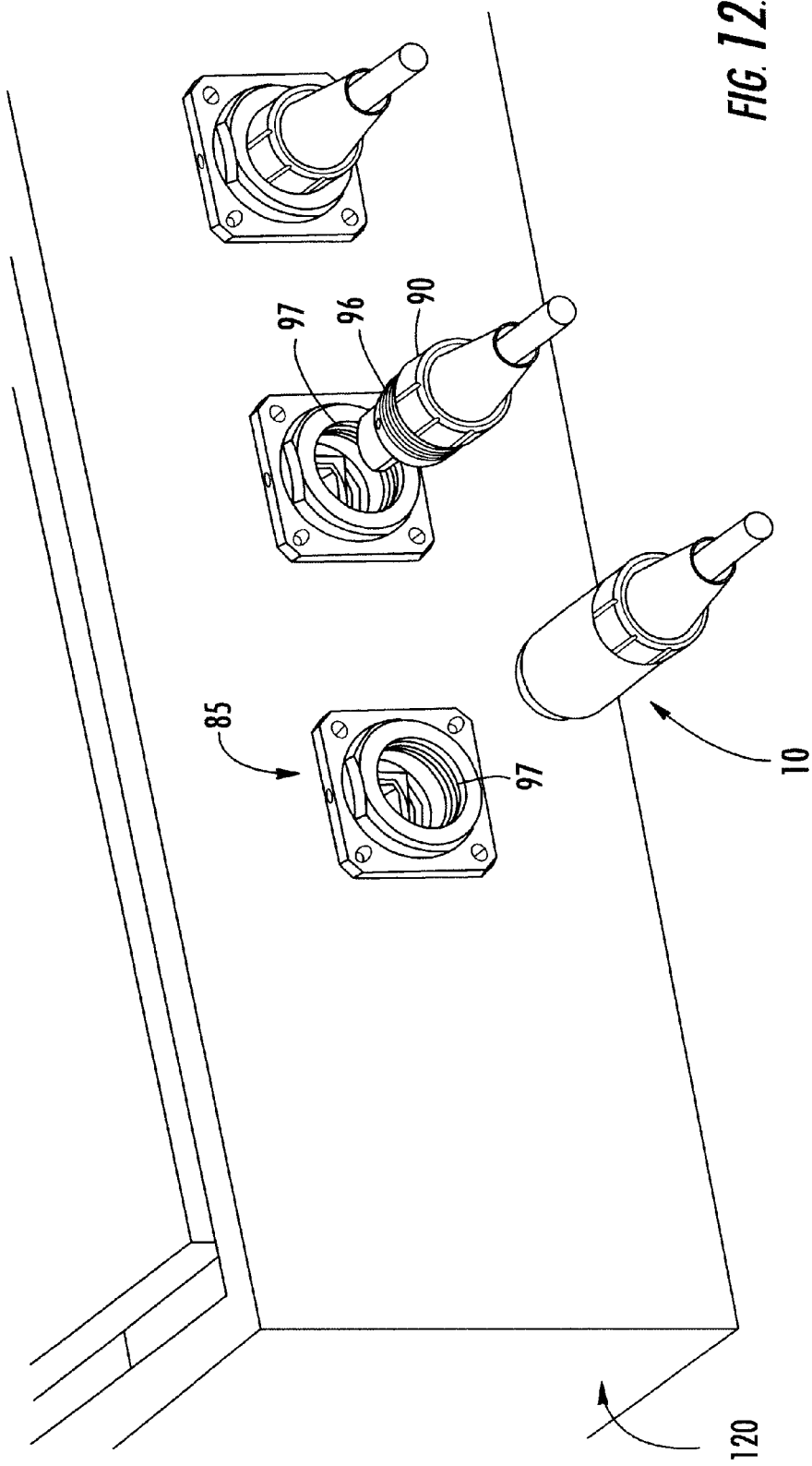

Having thus described the invention in general terms, reference will now be made to the accompanying drawings, which are not necessarily drawn to scale, and wherein:

FIG. 1 is a perspective view of an assembled fiber optic plug according to an embodiment of this invention;

FIG. 2 is an exploded perspective view of components of the fiber optic plug of FIG. 1, including a fiber optic connector, a crimp band, a crimp band support, a buffer tube, a grommet, an optical fiber cable according to an embodiment of this invention;

FIG. 3 is a cross-sectional view of the fiber optic plug of FIG. 1 taken along line 3—3;

FIG. 4 is a perspective view of the fiber optic plug of FIG. 1 prior to sliding the plug body forwardly along the fiber optic cable and over the fiber optic connector;

FIG. 5 is a cross-sectional view of the plug body of the fiber optic plug of FIG. 1 taken along line 5—5;

FIG. 6 is an exploded view of the fiber optic plug of FIG. 2, including the fiber optic cable, an inner support tube, the crimp band support, strength members, and exposed optical fibers according to an embodiment of this invention;

FIG. 7 is a perspective view of a crimp band according to another embodiment of this invention;

FIG. 8 is a perspective view depicting the mating of a fiber optic plug of an embodiment of this invention with a receptacle;

FIG. 9 is an exploded perspective view of a fiber optic receptacle with which the fiber optic plug of this invention may be mated;

FIG. 10 is a perspective view of a fiber optic plug according to an embodiment of this invention in which the cap has not yet been mounted to the remainder of the fiber optic plug;

FIG. 11 is a perspective view of a fiber optic plug of FIG. 9 following the mounting of the cap to the remainder of the fiber optic plug; and FIG. 12 is a perspective view of a plurality of fiber optic receptacles mating or mated with a plurality of fiber optic plugs.

DETAILED DESCRIPTION OF THE INVENTION

This invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a fiber optic plug 10 according to one embodiment of this invention is depicted. The fiber optic plug is mounted upon the end portion of a fiber optic cable 12 and is adapted to mate with a corresponding fiber optic receptacle. Typically, the receptacle provides access to an enclosure or the like such that the optical fibers (not shown) extending from the fiber optic cable may be aligned with and optically interconnected with optical fibers within the enclosure or the like. While the fiber optic plug may be designed to mate with a variety of fiber optic receptacles, the fiber optic plug is advantageously designed to mate with the fiber optic receptacle described by U.S. patent application Ser. No. 09/967,252, entitled *Fiber Optic Receptacle*, Attorney Docket No. HE0162, filed concurrently herewith and commonly assigned, the contents of which are incorporated herein by reference in their entirety.

As shown in FIGS. 2–4, the fiber optic plug 10 includes a plug body 14 and a fiber optic connector 16 mounted upon an end portion of the fiber optic cable 12 and disposed within the plug body. The fiber optic connector includes a connector housing 18 and a plug ferrule 20 at least partially disposed within the connector housing. In this regard, the connector housing typically extends lengthwise between rearward and forward ends 22, 24 and defines an internal passageway that extends between the opposed rearward and forward ends. The plug ferrule may therefore be mounted within the connector housing such that a front face 26 of the plug ferrule extends somewhat beyond the forward end of the connector housing. In order to limit the extension of the plug ferrule beyond the forward end of the connector housing, the connector housing generally defines an internal shoulder for engaging a corresponding shoulder 30 of the plug ferrule. However, it should be understood that the connector housing may engage the plug ferrule and limit its extension beyond the forward end of the connector housing in other manners.

In addition to the connector housing 18 and the plug ferrule 20, the fiber optic connector 16 typically includes other components depending upon the type of fiber optic connector. Although the fiber optic plug may include a variety of fiber optic connectors including MTRJ connectors, SC-DC connectors, Unicam™ connectors, SC connectors, LC connectors, and the like, the fiber optic plug 10 of the illustrated embodiment is shown to include an MTP connector by way of example, but not of limitation. As such, the MTP connector will be hereinafter described in further detail. The MTP connector includes a connector housing having a generally rectangular shape in the lateral cross section and a multi-fiber plug ferrule that also has a generally rectangular shape in lateral cross section. As shown, the connector housing of the MTP connector may include a larger portion proximate the rearward end 22 and a smaller portion proximate the forward end 24. Thus, the MTP connector housing defines an internal shoulder (not shown) between the larger and smaller portions of the housing. As shown in FIG. 2, the MTP plug ferrule further includes an enlarged portion 32 proximate the rear end 34 of the plug ferrule and a shaft portion 36 that extends from the enlarged portion to the front face 26 of the plug ferrule. Thus, the MTP plug ferrule also defines a shoulder 30 between the enlarged portion and the shaft portion. Accordingly, the internal shoulder of the connector housing and the shoulder of the MTP plug ferrule may cooperate to limit extension of the MTP plug ferrule beyond the forward end of the connector housing. The MTP plug ferrule also includes a window 28.

The MTP connector 16 may also include a spring push 38 that also extends lengthwise between opposed forward and rearward ends 40, 42. Like the connector housing 18, the spring push defines an internal passageway that extends lengthwise between the opposed forward and rearward ends and through which the optical fibers extend. The forward end of the spring push is adapted to be inserted within and to engage the connector housing. For example, the forward end of the spring push may include a pair of tabs 44 that extend laterally outward for engaging corresponding recesses defined by the connector housing and opening into the internal passageway thereof. The MTP connector housing may also include a spring 46 disposed between the forward end of the spring push and the rear end 34 of the plug ferrule 20 for biasing the plug ferrule forwardly within the connector housing such that the front face 26 of the plug ferrule is urged outwardly slightly beyond the forward end of the connector housing.

As mentioned above and as depicted in FIGS. 3–5, the fiber optic plug 10 also includes a plug body 14 extending lengthwise between opposed first end and second end 48, 50. While the fiber optic connector 16 is disposed within the plug body as shown in FIGS. 1 and 3, the front face 26 of the plug ferrule 20 is accessible via the first end of the plug body. Thus, the plug body serves to protect the fiber optic connector, while still permitting access to the optical fibers upon which the plug ferrule is mounted via the front face of the plug ferrule. As will be understood by those skilled in the art, the plug body is designed to engage a fiber optic receptacle in order to align and optically interconnect optical fibers of the plug ferrule with optical fibers of a receptacle ferrule.

The plug body 14 typically includes a shaft 52, 54. The shaft extends in the lengthwise direction and also defines an internal passageway within which the fiber optic connector 16 is disposed. In one embodiment, the shaft includes a frustoconical portion 52 proximate the second end 50 of the plug body and a cylindrical portion 54 forming a medial section of the plug body. As shown, the frustoconical portion generally increases in diameter in a direction extending from the second end of the plug body toward the cylindrical portion such that the frustoconical portion smoothly transitions into the cylindrical portion. The plug body also includes a shroud 56 proximate the first end 48 of the plug body. As shown in FIGS. 1 and 4, for example, the shroud extends from the cylindrical portion of the shaft to the first end. The shroud is also generally cylindrical and, in the illustrated embodiment, has a slightly larger diameter than the cylindrical portion of the shaft. While the shaft has been described according to the embodiment with the first end and second end above, it should be understood that the shaft of the plug body may have other configurations, such as, for example, a uniform cylindrical lengthwise extending shaft or a cylindrical lengthwise extending shaft that uniformly tapers from the second end of the plug body to the first end of the plug body.

Once assembled as described below, the fiber optic connector 16 is preferably disposed within the plug body 14 such that the plug body protects the fiber optic connector. However, the forward end 24 of the connector housing 18 as well as the front face 26 of the plug ferrule 20 are exposed and accessible within the shroud 56 via the first end 48 of the plug body. Nonetheless, the first end of the plug body preferably extends slightly beyond the front face of the plug ferrule in order to protect the front face of the plug ferrule from damage during handling, installation and the like.

In order to permit additional access to the forward end 24 of the connector housing 18 and the front face 26 of the plug ferrule 20 for cleaning and the like, the shroud 56 preferably defines at least one and, more typically, a pair of openings 58 on opposite sides of the shroud. These openings extend lengthwise from at least a medial portion of the shroud to the first end 48 of the plug body 14. Since the shroud is typically cylindrical, the shroud of this advantageous embodiment includes a pair of arcuate shroud portions 60 separated by the openings. The pair of openings defined by the shroud are typically aligned with one another and with respect to the plug ferrule 20 following assembly of the fiber optic plug 10. In a common embodiment in which the plug ferrule defines a plurality of bores extending lengthwise in a reference plane, the openings defined by the shroud are preferably centered about the reference plane. Although the openings may have various sizes, the openings preferably have a width greater than the height of the connector housing 18 and, more particularly, slightly greater than the height of an adapter sleeve of the receptacle into which the fiber optic plug is inserted. However, the openings also generally define an interior angle of less than 90°.

Thus, the openings 58 provide additional access to the forward end 24 of the connector housing 18 and the front face 26 of the plug ferrule 20 for cleaning and the like. In addition, a dust cap 61 is typically mounted upon the forward end of the connector housing during shipment and storage. Thus, the openings also facilitate access to the dust cap, such as during removal of the dust cap. In contrast, the arcuate shroud portions 60 protect the fiber optic connector 16 to prevent damage during handling, installation, preparation for attachment to the receptacle, or the like. In this regard, the plug body 14 including the arcuate shroud portions and the openings is designed such that the front face of the plug ferrule is never brought into contact with any unwanted portion of the fiber optic receptacle during the course of mating the fiber optic plug 10 and the fiber optic receptacle. Further, while the depicted embodiment includes openings, an alternative embodiment (not shown) may include a shroud without openings.

During installation, the plug body 14 is slid upon the fiber optic cable 12. The fiber optic connector 16 is then mounted upon the end portion of the fiber optic cable as shown in FIGS. 2–4. It should be understood that the fiber optic connector may be mounted upon the end portion of the fiber optic cable in various manners. However, the fiber optic plug 10 of one advantageous embodiment includes a crimp band 62 for connecting the fiber optic connector to the fiber optic cable. According to this advantageous embodiment, the fiber optic cable is initially prepared. With reference to FIGS. 2, 3, and 6, a protective jacket 64 of the fiber optic cable that is proximate the end of the fiber optic cable is removed to expose strength members 66 and a plurality of optical fibers 130. The strength members are then severed such that the strength members extend beyond the protective jacket, while the optical fibers extend beyond the strength members. While the fiber optic plug may be mounted upon various types of fiber optic cables, a fiber optic cable having a central buffer tube 70 and a crimp band support tube 76 will be hereinafter described for purposes of illustration, but not of limitation. In this instance, the optical fibers are disposed in a buffer tube that is also severed during the preparation of the fiber optic cable at a location between the protective jacket and the end of the strength members.

Once the fiber cable has been appropriately prepared, the crimp band 62, the spring push 38 and the spring 46 are slid onto the fiber optic cable 12. The plug ferrule 20 is then mounted upon the end portions of the optical fibers 130 such that the optical fibers extend through respective bores defined by the plug ferrule. The optical fibers are then secured within the bores, such as by means of an adhesive. After polishing the front face 26 of the plug ferrule and the end faces of the optical fibers, the plug ferrule is inserted into the connector housing 18. The spring push and the spring are then advanced into the rearward end 22 of the connector housing such that the tabs 44 of the spring push engage the corresponding recesses defined by the connector housing, thereby coupling the spring push and the connector housing. The spring is therefore disposed between the spring push and the rear end 34 of the plug ferrule so as to bias the plug ferrule forwardly and to expose the front face of the plug ferrule through the forward end 24 of the connector housing. In alternate embodiments, polishing of the end faces of the optical fibers may occur after the plug ferrule is inserted into the connector housing.

The strength members 66 that protrude beyond the protective jacket 64 of the fiber optic cable 12 are then flared over the rearward end 42 of the spring push 38. The crimp band 62 is next slid over the rearward end of the spring push such that the strength members are disposed between the crimp band and the rearward end of the spring push. In this regard, the crimp band is generally a tubular member that extends lengthwise between first and second ends 72, 74. The crimp band is therefore positioned such that the first end of the crimp band encircles the rearward end of the spring push with the strength members disposed therebetween. The first end of the crimp band may then be compressed in order to securely engage and affix the strength members between the first end of the crimp band and the rearward end of the spring push. As such, the crimp band is preferably formed of a material, such as annealed brass, that may be compressed and will thereafter retain its compressed shape. In order to provide proper support as the crimp band is compressed, the spring push is preferably formed of a relatively stiff material, such as a hard plastic. Thus, the rearward end of the spring push effectively serves as a crimp body. While the depicted embodiment includes a generally cylindrical crimp band and a generally rectangular spring push, the shapes of these elements are dependent on the type of connector used, and, thus, the shapes of these elements may be a variety of shapes including cylindrical, oval, rectangular, square, triangular, and the like.

According to this invention, the crimp band 62 may engage the fiber optic cable 12 at one point, such as the engagement of the strength members 66 between the first end 72 of the crimp band and the rearward end 42 of the spring push 38. Alternatively, the crimp band may engage the fiber optic cable at two points spaced apart in the lengthwise direction from one another. In addition to the engagement described above, a second end 74 may also surround the protective jacket 64 of the fiber optic cable and is adapted to be crimped thereupon so as to engage the protective jacket of the fiber optic cable. Still further, the crimp band may engage the fiber optic cable using of the fiber optic cable.

In order for the second end 74 of the crimp band 62 to securely engage the protective jacket 64, the fiber optic plug 10 may also include a crimp band support tube 76 that preferably surrounds an inner support tube 68. The crimp band support tube is typically formed of steel or another rigid material, that is slid over the optical fibers 130 prior to mounting the plug ferrule 20 upon the end portions of the optical fibers. In particular, the support tube is preferably slid into the end portion of the fiber optic cable 12 such that the support tube is disposed between the optical fibers and the strength members 66 and, more particularly, between the buffer tube 70 and the strength members. The support tube is positioned such that the support tube is disposed between the strength members and the buffer tube of the fiber optic cable at a location that is aligned with the second portion of the crimp band. Thus, the support tube serves to provide a rigid backing for the strength members and the protective jacket of the fiber optic cable as the second portion of the crimp band is compressed therebout. In addition, to restrict axial and forward movement of the buffer tube during temperature cycling of the cable, the support tube contains a stepped shoulder.

In order to protect the optical fibers 130 from water and other environmental factors, the fiber optic plug 10 may also include a grommet 78, typically formed of silicone. The grommet is also slid over the fiber optic cable 12 and the crimp band 62 prior to mounting the plug ferrule 20 upon the end portions of the optical fibers. Once the crimp band has been appropriately connected to the fiber optic cable and the spring push 38, the grommet may be slid forwardly along the fiber optic cable until the grommet abuts the second end 74 of the crimp band. Since the grommet fits tightly about the protective jacket 64 of the fiber optic cable, the grommet effectively seals the fiber optic connector including the fiber optic fibers from the environment and protects against environmental degradation.

In order to complete the assembly of the fiber optic plug 10, the plug body 14 is also slid forwardly along the fiber optic cable 12 from the position depicted in FIG. 4 until the fiber optic connector 16 is disposed within the internal passageway defined by the plug body as shown in FIGS. 1 and 3. To facilitate seating of the fiber optic connector within the plug body, the plug body preferably defines an internal shoulder 80 that contacts either the second end 74 of the crimp band 62 or, in other embodiments, the grommet 78. Preferably, the fiber optic connector is sized and the internal shoulder is defined within the plug body in such a manner that the entire fiber optic connector is disposed within the plug body with the front face 26 of the plug ferrule 20 being exposed via the first end 48 of the plug body. However, the first end of the plug body preferably does extend slightly beyond the front face of the plug ferrule.

Advantageously, the fiber optic plug 10 of this invention is designed such that the plug body 14 does not rotate about the longitudinal axis relative to the fiber optic connector 16 once the fiber optic plug has been assembled. In this regard, the plug body and the crimp band 16 may include respective engagement members that mate with one another to mechanically couple the crimp band and the plug body and to prevent relative rotation therebetween about the longitudinal axis. In the illustrated embodiment, for example, the crimp band includes a key 82, such as a longitudinally extending rib. See FIGS. 2 and 4. Correspondingly, the plug body defines a lengthwise extending passageway 84 and a keyway opening into the passageway that is sized to receive the key carried by the crimp band, as shown in cross section in FIG. 5. During the assembly process, the plug body is therefore slidably advanced over the fiber optic connector in such an orientation that the key carried by the crimp band is inserted through the keyway and into the passageway defined by the plug body. Once the key is engaged within the passageway, the plug body and the fiber optic connector are capable of moving in a lengthwise direction relative to one another, even through the plug body and the fiber optic connector are prevented from rotating about the longitudinal axis relative to one another.

As shown in FIGS. 2–4, the crimp band 62 of the illustrated embodiment includes an enlarged portion 86 proximate the second end 74 that carries the key 82. However, the key may be carried by other portions of the crimp band, if so desired. For example, a medial portion of the crimp band may carry the key as depicted in FIG. 7. In addition, it should be understood that the plug body may include the key and the crimp band may include lengthwise extending passageway. Moreover, the crimp band and the plug body may include keys and passageways having other shapes as well as other types of engagement members, if so desired, in order to prevent relative rotation therebetween about the longitudinal axis.

As a result of the mechanical coupling of the plug body 14 to the crimp band 62 and, in turn, the connection of the crimp band to the fiber optic cable 12, the fiber optic plug 10 advantageously protects the optical fibers 130 from the deleterious effects of torque imparted to the fiber optic cable. In this regard, the forces generated by torque imparted to the fiber optic cable are transmitted along the fiber optic cable and to the crimp band via the connection between the second portion 65 of the crimp band and the fiber optic cable. The forces generated by torque will, in turn, be transmitted from the crimp band to the plug body via the respective engagement members, such as the key 82 carried by the crimp band and the corresponding passageway 84 defined by the plug body. The plug body, in turn, transmits the forces generated as a result of the torque imparted to the receptacle with which the fiber optic plug is mated. Since the receptacle is typically fixedly mounted to or within an enclosure or the like, the optical fibers are effectively protected and isolated from the deleterious effects of the forces generated by torque imparted to the fiber optic cable. For example, the signals transmitted via the optical fibers should not be attenuated by torque to which the fiber optic cable is subjected. While the fiber optic plug of this invention may be mounted upon any of a variety of different fiber optic cables, the fiber optic plug may advantageously be mounted upon some of the stiffer fiber optic cables, such as the cables designed for outdoor applications, that transmit a greater percentage of the forces generated by torque to the fiber optic connector 16.

Once the fiber optic plug 10 has been assembled, the fiber optic plug may be mated with a corresponding receptacle 85 as shown in FIGS. 8 and 12. In this regard, the first end 48 of the plug body 14 is inserted into a receptacle such that the front face 26 of the plug ferrule 20 is received within an adapter sleeve 87 of the receptacle. As described in the concurrently filed patent application entitled *Fiber Optic Receptacle*, the shroud 56 may include an alignment member, such as a lengthwise extending groove 88, for engaging a corresponding alignment member of the receptacle, such as a pin, to ensure that the plug ferrule and the adapter sleeve are aligned. As also described in detail in the patent application entitled *Fiber Optic Receptacle*, and as shown in FIGS. 8 and 9, the receptacle typically includes a receptacle housing 89 defining an internal cavity opening through opposed forward and rearward ends and the adapter sleeve disposed therewithin. The adapter sleeve serves to align the plug ferrule of the fiber optic plug with a receptacle ferrule mounted upon end portions of optical fibers that extend through the enclosure or the like, thereby aligning the corresponding optical fibers of the fiber optic plug and the fiber optic receptacle. The fiber optic receptacle may also include an adapter retainer 91 that is threadably connected to the fiber optic receptacle housing for retaining the adapter sleeve, as well as a bias member, such as a pair of springs 93, for urging the adapter sleeve toward the first end of the receptacle. Moreover, the receptacle may include an inner seal, such as an o-ring 95, for protecting the internal cavity of the receptacle housing from water and other sources of environmental degradation. It should be understood that while the receptacles depicted in FIGS. 8, 9, and 12 are advantageous, the fiber optic plug is capable of mating with a variety of other receptacles, if so desired.

In order to securely connect the fiber optic plug 10 to the fiber optic receptacle 85, the plug body 14 may further include a collar 90 that is disposed upon the shaft and that is designed to threadably engage the fiber optic receptacle. In this regard, the collar is preferably disposed upon the shaft such that the travel in the collar in the lengthwise direction is limited, while allowing the collar to rotate freely about the longitudinal axis relative to the shaft. In one advantageous embodiment, the shaft includes an externally threaded portion 92 that is spaced somewhat from the shroud. The collar is also internally threaded (not shown) such that the collar must be threadably advanced onto the shaft and over the externally threaded portion of the shaft in order to mount the collar upon the shaft. According to this embodiment, once the collar has been threadably advanced beyond the externally threaded portion of the shaft, the collar is free to slide in a lengthwise direction relative to the shaft. The forward movement of the collar relative to the shaft is limited, however, by the shroud 56. In this regard, the shroud is generally slightly larger than the shaft such that a shoulder is defined between the shaft and the shroud. Since the shroud is also preferably larger than the collar, the forward movement of the collar relative to the shaft is limited upon contact of the collar with the shoulder defined between the shroud and the shaft.

Referring now to FIG. 12, a plurality of fiber optic plugs 10 are shown mating or mated with a plurality of fiber optic receptacles 85 that are affixed to an enclosure 120 such that the optical fibers extending from the front face 26 of the plug ferrule 20 (not shown) may be aligned with and optically interconnected with optical fibers (not shown) within the enclosure.

As shown in FIG. 10, the collar 90 also generally includes an externally threaded portion 96 for engaging an internally threaded portion 97 of the fiber optic receptacle 85 in order to secure the fiber optic plug 10 to the fiber optic receptacle. In order to facilitate grasping of the collar so as to rotate the collar relative to the shaft, the collar may also include a portion 98 that is knurled, slotted, ribbed or the like.

Thus, in order to mate the fiber optic plug 10 with the fiber optic receptacle 85 as shown in FIGS. 8 and 12, the fiber optic plug is inserted into a corresponding receptacle such that the front face 26 of the plug ferrule 20 of the fiber optic plug is inserted into the adapter sleeve of the fiber receptacle as described above. In order to insert the plug ferrule of the fiber optic plug into the adapter sleeve, the shroud 56 is also inserted into the fiber optic receptacle. In order to protect the interior of the fiber optic receptacle from water and other environmental factors, the shroud may include a seal 95, such as an o-ring, disposed within a circumferential groove for forming a seal with the receptacle. The collar 90 is then rotated relative to the shaft of the plug body 14 such that the externally threaded portion 96 of the collar engages the internally threaded portion 97 of the fiber optic receptacle, thereby connecting the fiber optic plug and the receptacle. Thus, any forces generated by torque or axial tension imparted upon the fiber optic cable 12 and transmitted along the fiber optic cable to the crimp band 62 and then to the plug body are, in turn, transmitted to the fiber optic receptacle to further isolate the optical fibers 130 from the deleterious effects of these forces.

According to one advantageous embodiment, the shroud 56 is sized such that the adapter sleeve 87 into which the plug ferrule 20 is inserted is partially disposed within the openings 58 defined by the shroud. In this regard, lateral portions of the adapter sleeve are preferably disposed within the openings defined by the shroud once the fiber optic plug 10 has been mated with the corresponding fiber optic receptacle 85. Since conventional designs require the shroud to completely surround the plug ferrule and, in turn, to completely surround the adapter sleeve, the shroud of this invention may be reduced in size relative to these conventional designs. Since the size of the plug body 14 including the shroud is typically a limiting factor upon the size of the passageways through which the fiber optic cable 12 upon which the plug body is mounted may be pulled, the plug body of this invention may be capable of being pulled through smaller passageways since the shroud may be reduced in size relative to conventional designs.

In order to further assist in the installation of a fiber optic cable 12 upon which the fiber optic plug 10 is mounted within a passageway, the fiber optic plug may also include a cap 100 mounted upon the plug body 14 to cover at least the first end 48 of the plug body during installation, as shown in FIGS. 10 and 11. The cap is typically a cylindrical body having a closed end, such as a rounded or spherical end. The cap defines a hollow interior so as to be mounted over the first end of the plug body and engaged by the collar 90. In this regard, the cap defines an internally threaded portion that engages the externally threaded portion 96 of the collar. Once the cap is connected to the collar, the travel of the cap in the lengthwise direction is limited even though the cap is free to rotate or swivel about the longitudinal axis relative to the plug body. The cap is typically formed of a metal, such as stainless steel, or other rigid material to protect the forward end 24 of the connector housing 18 and the front face 26 of the plug ferrule 20 that may also be covered by a dust cap 61 as shown in FIG. 10, but are otherwise exposed via the first end of the plug body during installation of the fiber optic cable. By permitting the cap to rotate or swivel relative to the fiber optic plug, a rope, cable or the like may be connected to the cap and, more particularly, to an opening 102 defined by the cap in order to pull the fiber optic cable upon which the fiber optic plug is mounted through a passageway. Even though the passageway may twist and turn, the cap is permitted to rotate or swivel relative to the fiber optic plug and in turn, relative to the fiber optic cable while the fiber optic plug and the fiber optic cable upon which the fiber optic plug is mounted are pulled through the passageway. Thus, the fiber optic plug and the fiber optic cable will be isolated from this rotation and the forces generated thereby. Consequently, the optical fibers 130 will also be isolated and protected from the forces causing rotation of the cap during installation. By being connected directly to the collar of the plug body, however, the cap permits the fiber optic cable to swivel or rotate while having fewer parts than conventional pulling grips.

Once the fiber optic cable 12 has been pulled through the passageway and the fiber optic plug 10 is being prepared to mate with the fiber optic receptacle 85, the cap 100 is removed and the fiber optic plug and the fiber optic receptacle are mated as described above. Thus, the collar 90 may alternately serve to threadably connect both the cap and the receptacle.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A fiber optic plug comprising:
    a fiber optic connector comprising a connector housing and a plug ferrule least partially disposed within the connector housing and capable of being mounted upon an end portion of at least one optical fiber; and
    a plug body extending lengthwise between a first end and a second end, the first end opposed from the second end, and having a shroud proximate the first end thereof, the shroud defining a pair of openings on opposite sides thereof, the openings extending lengthwise from at least a medial portion of the shroud to the first end of the plug body,
    wherein the fiber optic connector is disposed within the plug body such that the plug ferrule is accessible within the shroud via the first end of the plug body; and
    wherein the lengthwise extending plug body defines a longitudinal axis, and wherein the fiber optic connector is disposed in a fixed position with respect to the plug body relative to rotation about the longitudinal axis such that the openings defined by the shroud are aligned with the plug ferrule; and
    wherein the plug body further comprises
        a shaft proximate the shroud; and
        a collar disposed upon the shaft such that travel of the collar in the lengthwise direction is limited while permitting rotation of the collar about the longitudinal axis relative to the shaft.

2. The fiber optic plug according to claim 1, wherein the pair of openings defined by the shroud are aligned with one another.

3. The fiber optic plug according to claim 1, wherein the plug ferrule defines a plurality of bores extending lengthwise in a reference plane, and wherein the openings defined by the shroud are centered about the reference plane.

4. The fiber optic plug according to claim 1, wherein the plug ferrule defines a plurality of bores extending lengthwise in a reference plane, and wherein the openings defined by the shroud are bisected by the reference plane.

5. The fiber optic plug according to claim 1, wherein the shroud is cylindrical, and wherein the first end of the shroud comprises a pair of arcuate shroud portions separated by the openings.

6. The fiber optic plug according to claim 1, wherein the first end of the shroud protrudes beyond the plug ferrule.

7. A fiber optic plug comprising:
    a fiber optic connector comprising a connector housing and a plug ferrule at least partially disposed within the connector housing and capable of being mounted upon an end portion of at least one optical fiber; and
    a plug body extending lengthwise between a first end and a second end, the first end opposed from the second end, and having a shroud proximate the first end thereof, the shroud defining a pair of openings on opposite sides thereof, the openings extending lengthwise from at least a medial portion of the shroud to the first end of the plug body,
    wherein the fiber optic connector is disposed within the plug body such that the plug ferrule is accessible within the shroud via the first end of the plug body; and
    wherein the lengthwise extending plug body defines a longitudinal axis and the plug body further comprises
        a shaft proximate the shroud; and
        a collar disposed upon the shaft such that travel of the collar in the lengthwise direction is limited while permitting rotation of the collar about the longitudinal axis relative to the shaft.

8. The fiber optic plug according to claim 7, wherein the shaft comprises a frustoconical portion proximate the second end of the plug body and a cylindrical portion forming a medial section of the plug body and extending lengthwise proximate the first end of the plug body.

9. The fiber optic plug according to claim 8, wherein the shroud has a larger diameter than the cylindrical portion of the shaft.

10. A fiber optic plug comprising:
    a fiber optic connector comprising a connector housing and a plug ferrule at least partially disposed within the connector housing and capable of being mounted upon an end portion of at least one optical fiber; and
    a plug body extending lengthwise between a first end and a second end, the first end opposed from the second end, and having a shroud proximate the first end thereof, the shroud defining a pair of openings on opposite sides thereof, the openings extending lengthwise from at least a medial portion of the shroud to the first end of the plug body,
    wherein the fiber optic connector is disposed within the plug body such that the plug ferrule is accessible within the shroud via the first end of the plug body; and
    wherein the shroud defines a lengthwise extending groove for receiving a corresponding alignment member of a fiber optic receptacle in order to align the fiber optic plug with the fiber optic receptacle.

11. The fiber optic plug according to claim 1, wherein the fiber optic connector comprises an MTRJ connector.

12. The fiber optic plug according to claim 1, wherein the fiber optic connector comprises an SC-DC connector.

13. The fiber optic plug according to claim 1, wherein the fiber optic connector comprises an SC connector.

14. The fiber optic plug according to claim 1, wherein the fiber optic connector comprises an LC connector.

15. The fiber optic plug according to claim 1, wherein the fiber optic connector comprises an MTP connector.

16. The fiber optic plug according to claim 1, wherein the fiber optic connector comprises a Unicam connector.

17. A fiber optic plug comprising:
    a fiber optic connector comprising a connector housing and a plug ferrule at least partially disposed within the connector housing and capable of being mounted upon an end portion of at least one optical fiber; and
    a plug body extending lengthwise between a first end and a second end and having a shroud proximate the first end thereof, wherein the first end is opposed from the second end;
    wherein the fiber optic connector is disposed within the plug body such that the plug ferrule is accessible within the shroud via the first end of the plug body; and wherein the lengthwise extending plug body defines a longitudinal axis, and wherein the fiber optic connector is disposed in a fixed position with respect to the plug body relative to rotation about the longitudinal axis; and wherein the plug body further comprises
a shaft proximate the shroud; and a collar disposed upon the shaft such that travel of the collar in the lengthwise direction is limited while permitting rotation of the collar about the longitudinal axis relative to the shaft.

* * * * *